United States Patent
Griffith et al.

(10) Patent No.: US 7,869,364 B2
(45) Date of Patent: Jan. 11, 2011

(54) SIP SERVER OVERLOAD DETECTION AND CONTROL

(75) Inventors: Laura Griffith, Gaithersburg, MD (US); Mark Kushnir, Washington, DC (US)

(73) Assignee: BroadSoft, Inc., Gaithersburg, MD (US)

( * ) Notice: Subject to any disclaimer, the term of this patent is extended or adjusted under 35 U.S.C. 154(b) by 165 days.

(21) Appl. No.: 12/259,011

(22) Filed: Oct. 27, 2008

(65) Prior Publication Data
US 2010/0103818 A1    Apr. 29, 2010

(51) Int. Cl.
    *G01R 31/08*    (2006.01)
(52) U.S. Cl. ............ 370/235; 370/230; 370/352; 709/227; 709/203; 379/93.14
(58) Field of Classification Search ......... 370/235, 370/230, 352; 709/227, 203; 379/93.14
    See application file for complete search history.

(56) References Cited

U.S. PATENT DOCUMENTS

| | | | |
|---|---|---|---|
| 7,346,043 B1 | 3/2008 | Olshansky et al. | |
| 7,453,804 B1 * | 11/2008 | Feroz et al. | 370/230 |
| 2005/0105464 A1 | 5/2005 | Acharya et al. | |
| 2006/0075084 A1 | 4/2006 | Lyon | |
| 2007/0070989 A1 | 3/2007 | Savoor et al. | |
| 2008/0118043 A1 * | 5/2008 | Kawaguchi et al. | 379/93.14 |
| 2009/0122705 A1 * | 5/2009 | DeVal et al. | 370/235 |

\* cited by examiner

*Primary Examiner*—Huy D Vu
*Assistant Examiner*—Kibrom T Hailu
(74) *Attorney, Agent, or Firm*—Venable LLP; Michael A. Sartori; Yao Wang

(57) ABSTRACT

The current invention is related to a system and a method for session overload protocol (SIP) server overload detection and control. The current invention proceeds by receiving SIP messages at the SIP server from a communications network; processing the received SIP messages; detecting an overload based on a trigger condition as a result of receiving and processing SIP messages; and transitioning the SIP server to an overload state and applying appropriate control actions to mitigate the detected overload.

22 Claims, 7 Drawing Sheets

SIP SERVER OVERLOAD DETECTION AND CONTROL

FIELD OF INVENTION

The current invention relates to the field of communication networks.

BACKGROUND OF INVENTION

Communication services today are generally based on either the public switched telephone network (PSTN), which provides circuit-switched voice servers, real-time faxing, and central office (CO)-based voice mail, or the Internet protocol (IP)-based Internet, intranet, or extranet systems, which provide services such as e-mail.

The PSTN and the IP-based systems rely on different architectures and protocols. The PSTN generally refers to a collection of interconnected systems operated by the various telephone companies and post telephone and telegraph administrations (PTTs) around the world. PSTN systems use dedicated circuits. That is, when a phone number is dialed, switches in the network lock-up a dedicated circuit that can only be used by that phone call and exist until that phone call is terminated. Thus, even when there is no information to carry as part of the transmission (e.g., the callers are silent) the circuit is still in use by the call.

Instead of sending transmissions over a dedicated circuit, IP-based systems packetize the transmissions with self-contained addresses that are then uploaded through a gateway into the network where they are relayed between routers until they reach their final destination. This packetization of transmissions allows for much more efficient transport of transmissions since empty space in a transmission (where no information is present) can be filled by additional transmissions.

Traditional telecommunications carriers and service providers are moving from PSTN to packet-based IP infrastructure. The contents offered over IP include, for example, voice, fax, instant messaging, digital television, etc. In the case of voice, the technology is referred to as voice over IP (VOIP).

One aspect for a telephony network may be call control, including call setup and teardown. As VOIP operates in the absence of dedicated circuits, call control may be used to avoid service outage, quality of service (QoS) degradation, and loss of revenue. Call control may be achieved via Session Initiation Protocol (SIP).

SIP is a signaling protocol using text messages. There are two basic SIP entities: SIP user agents (UAs) and SIP servers. SIP servers may further be grouped into proxy servers for session routing and registration servers for UA registration.

SIP is an application level protocol that may run on top of a transport layer, such as the transmission control protocol (TCP) or user diagram protocol (UDP).

SIP is widely used for setting up and tearing down multimedia communication sessions such as voice and video calls over the Internet. Other SIP application examples include video conferencing, streaming multimedia distribution, instant messaging, presence information and online games. For example, using SIP for instant messaging and presence implies an additional load on the SIP based call control infrastructure.

In November 2000, SIP was accepted as a $3^{rd}$ Generation Partnership Project (3GPP) signaling protocol and permanent element of the IP multimedia subsystem (IMS) architecture for IP based streaming multimedia services in cellular systems. This development means that the control infrastructure of the SIP-based call control infrastructure needs to handle terminal mobility between different cell boundaries, in addition to call setup and teardown. Both the support for mobile users and hand-off represents additional loads on the call control infra-structure.

SUMMARY

The invention may include a method to detect and mitigate SIP server overload. The method may proceed by receiving SIP messages at the SIP server from a communications network, processing the received SIP messages, detecting an overload based on a trigger condition as a result of receiving and processing SIP messages, and transitioning the SIP server to an overload state and applying appropriate control actions to mitigate the detected overload.

The invention may include a computer-readable or machine-readable medium for implementing the method for SIP server overload detection and mitigation. A "computer-readable medium" or "machine-readable medium" may refer to any storage device used for storing data accessible by a computer. Exemplary computer-readable medium may include: a hard disk drive; a floppy disk; a magneto-optical disk; an optical disk; a magnetic tape; a flash removable memory; and a memory chip.

The invention may provide a system for multimedia communication over a network. The system may include a network connection to receive and transmit SIP messages between a SIP server and the network, a processing module in the SIP server to process and service received SIP messages, and an overload detection module to perform overload control for the SIP server.

BRIEF DESCRIPTION OF THE DRAWINGS

Embodiments will now be described in connection with the associated drawings.

DETAILED DESCRIPTION OF THE EMBODIMENTS

In an exemplary embodiment of the invention, a overload control module is used to detect SIP server overload and to apply control actions thereto. For overload detection, the module compares at least one resource metric against a threshold. For overload control, the module transitions the SIP server to a different state after an overload is detected and then applies a set of control actions associated with the state.

Figure 1:
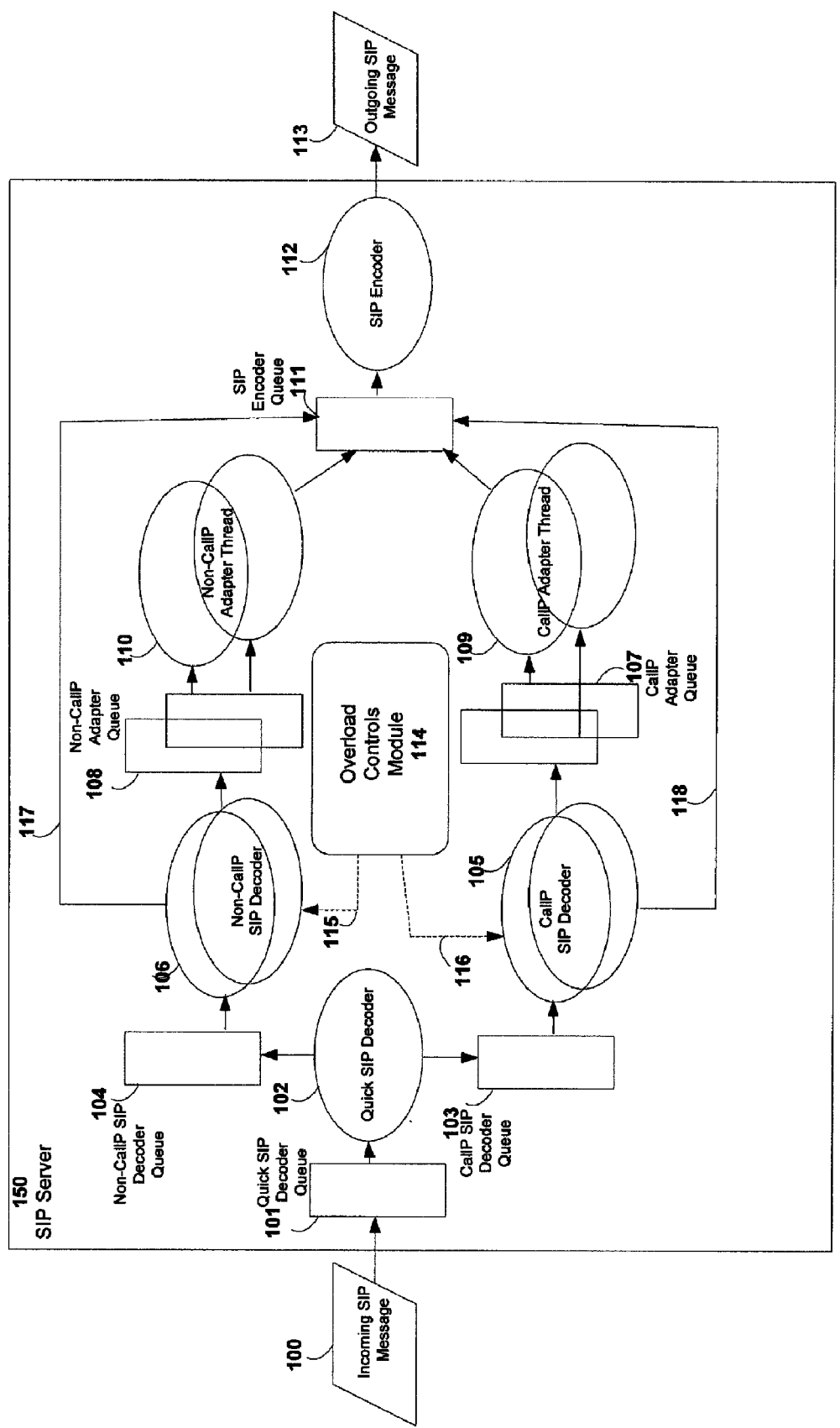
FIG. 1 illustrates the internal queues and process threads associated with a SIP server in an exemplary embodiment of the invention.

FIG. 1 illustrates the internal queues and process threads associated with SIP server 150 in an exemplary embodiment of the invention. The SIP server 150 may include, for example, a quick SIP decoder queue 101, a quick SIP decoder 102, a CallP SIP decoder queue 103, a non-CallP SIP decoder queue 104, a plurality of CallP decoders 105, a plurality of non-CallP SIP decoders 106, a plurality of CallP adapter queues 107, a plurality of non-CallP adapter queues 108, a plurality of CallP adapter threads 109, a plurality of non-CallP adapter threads 110, a SIP encoder queue 111, a SIP encoder 112, and a overload control module 114.

Incoming SIP message 100 may be time stamped with the most current time and placed into the quick SIP decoder queue 101. The quick SIP decoder 102 may perform a quick parsing of the incoming SIP message 100 to determine if the message is a call processing (CallP) request or response (e.g., INVITE) or a non-call processing (non-CallP) related request or response (e.g., REGISTER). CallP related messages may be routed to the CallP SIP decoder queue 103 while non-CallP related messages may be routed to the non-CallP SIP decoder queue 104. The messages may be time stamped with the most current time again as they are placed into the respective decoder queues 103 and 104 to indicate the precise entry time.

The CallP SIP decoder 105 may parse a message in the CallP SIP decoder queue 103 to determine if the message is a request or response associated with an existing session or if the message is a new request. Depending on the outcome, the parsed message contents may be placed into CallP adapter queue 107 where the messages may again be time stamped with the most current time to indicate precise time of entry into CallP adapter queue 107. During this process, messages belonging to existing sessions may be assigned to the CallP adapter queue 107 associated to the CallP adapter thread 109 managing that already existing session.

CallP adapter thread 109 may pull messages off CallP adapter queue 107, process the messages, and apply services when appropriate. When an outbound SIP message is required in reference to a session, the adapter thread 109 may pass the required information in a message to the SIP encoder queue 111, where the message may again be time stamped with the most current time to indicate precise time of entry into SIP encoder queue 111.

Meanwhile, the non-CallP SIP decoder 106 may parse a message in the non-CallP SIP decoder queue 104 to determine if the message is a request or response associated with an existing session or if the message is a new request. Depending on the outcome, the parsed message contents may be placed into non-CallP adapter queue 108 where the messages may again be time stamped with the most current time to indicate precise time of entry into non-CallP adapter queue 108. During this process, messages belonging to existing sessions may be assigned to the non-CallP adapter queue 108 associated to the non-CallP adapter thread 110 managing that already existing session.

Non-CallP adapter thread 110 may pull messages off non-CallP adapter queue 108, process them, and apply services when appropriate. When an outbound SIP message is required in reference to a session, the non-CallP adapter thread 110 may pass the required information in a message to the SIP encoder queue 111, where the message may again be time stamped with the most current time to indicate precise time of entry into SIP encoder queue 111.

The SIP encoder 112 may pull messages off the SIP encoder queue 111, build an outgoing SIP message and then send the outgoing SIP message 113.

The overload control module 114 may be used to detect overload of the SIP server 150 and to apply control actions to the SIP server 150 when overload is detected.

Figure 2:
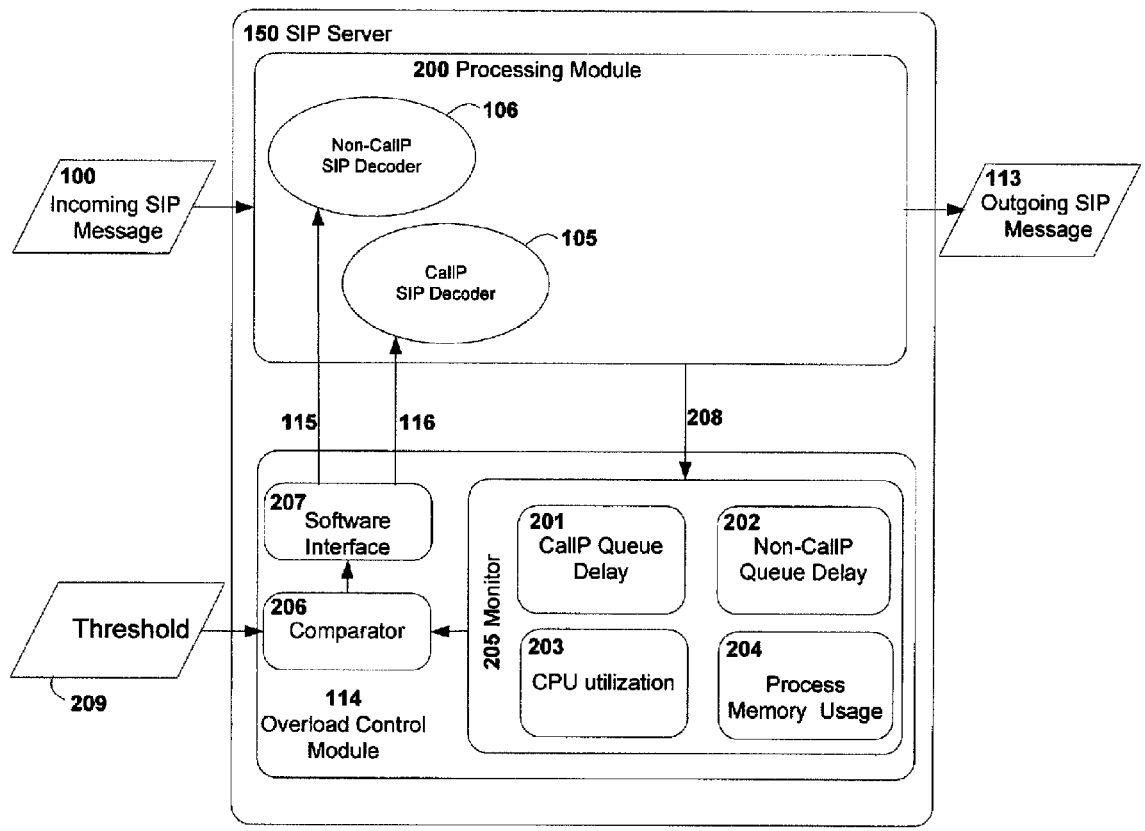
FIG. 2 illustrates the components of an overload control module in an exemplary embodiment of the invention.

FIG. 2 illustrates the components of the overload control module 114 in an exemplary embodiment of the invention. The SIP server may be viewed as including, for example, a processing module 200 and the overload control module 114. The overload control module 114 may include, for example, a monitor 205, a comparator 206, and a software interface 203. The processing module 200 may include, for example, the quick SIP decoder queue 101, a quick SIP decoder, a CallP SIP decoder queue 103, a non-CallP SIP decoder queue 104, a plurality of CallP decoders 105, a plurality of non-CallP SIP decoders 106, a plurality of CallP adapter queues 107, a plurality of non-CallP adapter queues 108, a plurality of CallP adapter threads 109, a plurality of non-CallP adapter threads 110, a SIP encoder queue 111, and a SIP encoder 112. For illustration purpose only, the processing module 200 is depicted in FIG. 2 with only the CallP decoder 105 and the non-CallP SIP decoder 106.

While the received incoming SIP message 100 is being processed by the processing module 200 of the SIP server 150, the overload controls module 114 may continually track resource metrics as a result of the execution of processing module 200. This tracking may be accomplished by the monitor 205 which may read resource metrics from the processing module 200 via path 208. The comparator 206 may compare a tracked resource metric with one instance of thresholds 209. The software interface 207 may receive the comparison result and send signals to the processing module 200 via paths 115 and 116. The tracked resource metrics may include, such as, for example, CallP queue delay 201, non-CallP queue delay 202, CPU utilization 203, process memory usage 204, as well as others.

For example, CallP queue delay 201 may refer to the time that a message spends in queue 107. CallP queue delay 201 may be monitored by comparing the current time when the message is pulled out of the queue with the queue entry time of the message. For example, if the current CallP queue delay 201 surpasses a queue delay threshold, the overload controls module 114 may transition the SIP server 150 to an appropriate CallP overload state where control actions may be applied to mitigate the overload.

For example, non-CallP queue delay 202 may refer to the time that a message spends in queue 108. Non-CallP queue delay 202 may be monitored by comparing the current time when the message is pulled out of the queue with the queue entry time of the message. For example, if the current non-CallP queue delay 202 surpasses a queue delay threshold, the overload controls module 114 may transition the SIP server 150 to an appropriate non-CallP overload state where control actions may be applied to mitigate the overload.

A rolling average queue delay may be calculated for both CallP queue delay 201 and non-CallP queue delay 202. The rolling average queue delay may be calculated from a moving window covering a number of queue delays. The rolling average queue delay may be used to smooth unusual spiky queue delay. The overload controls module 114 may compare a rolling average queue delay against a queue delay threshold.

In the example of CallP rolling average queue delay, if the threshold to enter an overload state is 500 msec and if the current CallP rolling average queue delay for the CallP adapter queue 107 is 550 msec, the SIP server 150 may be transitioned to a CallP overload state. The overload controls module 114, via software interface 207 and pathway 116, may inform the SIP CallP decoder 105 to, for example, block 50% of new calls. When the SIP CallP decoder 105 receives the signal, the SIP CallP decoder 105 may, for example, reject 50% of incoming new call requests by generating a "503 Service Unavailable" response and sending the response directly, via pathway 118, to the SIP encoder queue 111, thus bypassing the CallP adapter thread 109.

In the example of non-CallP rolling average queue delay, if the threshold to enter an overload state is 500 msec and if the current non-CallP rolling average queue delay for the non-CallP adapter queue 108 is 550 msec, the SIP server 150 may be transitioned to a non-CallP overload state. The overload controls module 114 may inform the SIP non-CallP decoder 106, by software interface 207 via pathway 115, to, for example, block 50% of new SIP non-callP requests. When the SIP non-CallP decoder 106 receives the signal, the SIP non-CallP decoder 106 may, for example, reejct 50% of incoming new requests by generating a "503 Service Unavailable" response and sending the response directly, via pathway 117, to the SIP encoder queue 111, thus bypassing the non-CallP adapter thread 110.

For example, CPU utilization 203 may refer to the percentage of CPU time occupied by running components of the server 150 application program on a computer or computer system. For example, if the current CPU utilization 203 surpasses a CPU utilization threshold, overload controls 114 may transition the SIP server 150 to the appropriate CallP or non-CallP overload state where control actions may be applied to mitigate the overload. In the case of CallP CPU utilization overload, the overload controls module 114 may inform both the SIP CallP decoder 105 and the SIP non-CallP decoder 106, by software interface 207 via pathways 115 and 116 respectively, to, for example, block 100% of new requests. When the SIP CallP decoder 105 and the SIP non-CallP decoder 106 receive the signal, both decoders may, for example, reject 100% of incoming new requests by generating a "503 Service Unavailable" response and sending the response directly, via pathway 118, to the SIP encoder queue 111, thus bypassing both the CallP adapter thread 109 and the non-CallP adapter thread 110.

For example, process memory usage 204 may refer to the amount of computer hardware memory consumed by running components of the server 150 application program on a computer or computer system. For example, if the current process memory usage 204 surpasses a memory usage threshold, the overload controls module 114 may transition the SIP server 150 to an appropriate overload state where control actions may be applied to mitigate the overload. In the case of process memory utilization overload, the overload controls module 114 may inform both the SIP CallP decoder 105 and SIP non-CallP decoder 106, by software interface 207 via pathways 115 and 116 respectively to, for example, block 100% of new requests. When the SIP CallP decoder 105 and SIP non-CallP decoder 106 receive the signal, both decoders, may, for example, reject 100% of incoming new requests by generating a "503 Service Unavailable" response and sending the response directly, via pathway 118, to the SIP encoder queue 111, thus bypassing both the CallP adapter thread 109 and non-CallP adapter thread 110.

As illustrated in FIGS. 1 and 2, the overload control module 114 may be part of the SIP server 150. In another exemplary embodiment, the overload control module 114 may be a stand-alone module outside of the SIP server 150 and may perform overload control for multiple SIP servers.

The threshold 209 is illustrated in FIG. 2 as being exterior to the SIP server 150. For example, the threshold may reside in a configuration file which may be read by the SIP server 150 during initiation. However, the threshold 209 may also reside inside the SIP server 150. For example, the threshold 209 may be defined by the software code implementing the SIP server 150. Further, the threshold 209 may provide more thresholds used by comparator 206 for the various resource metrics of monitor 205.

Figure 3:
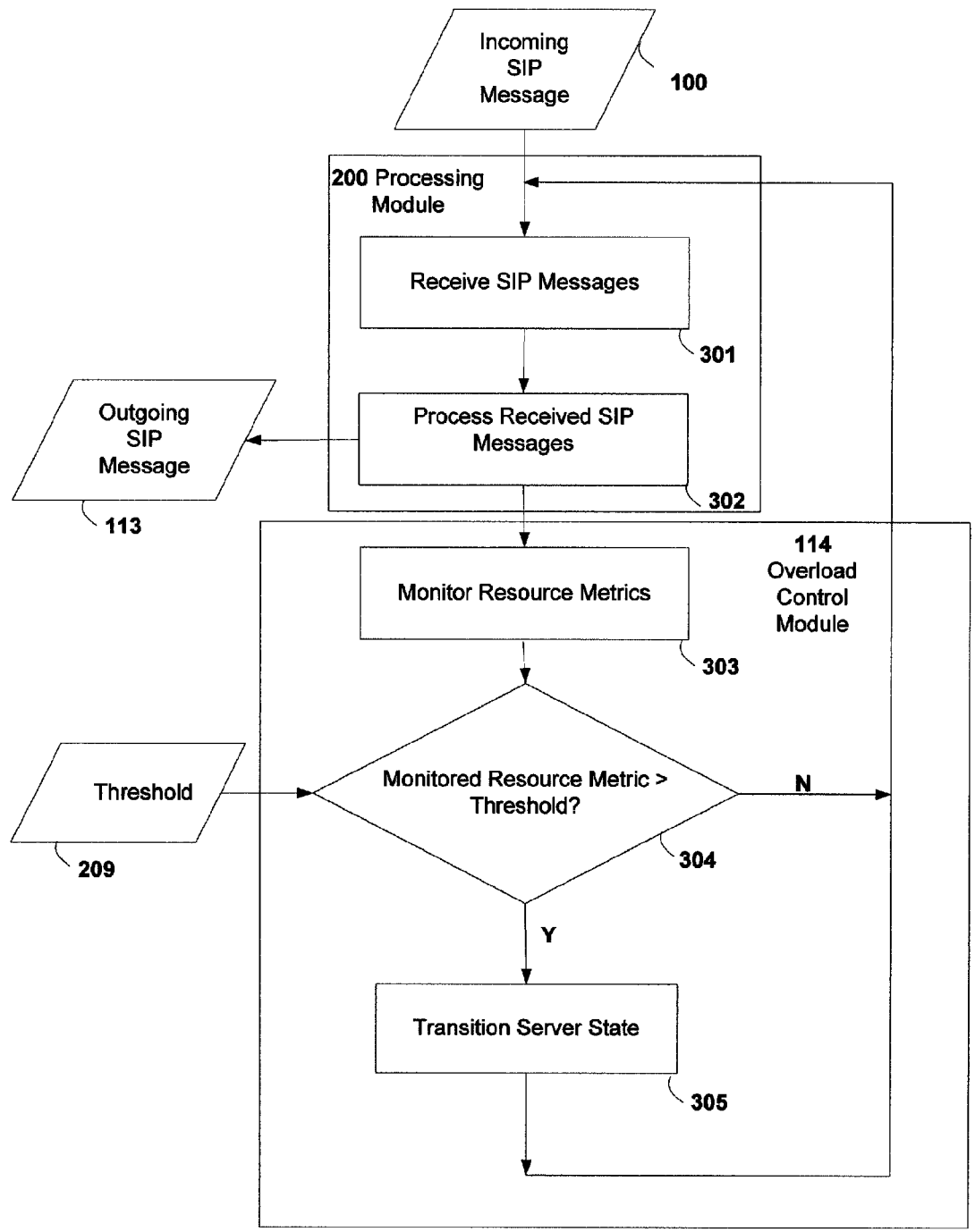
FIG. 3 further illustrates the SIP server composition and work-flow in an exemplary embodiment of the invention.

FIG. 3 further illustrates the SIP server 150 composition and work-flow in an exemplary embodiment of the invention. In block 301, the processing module 200 may receive incoming SIP messages 100. In block 302, the processing module 200 may process the received messages to generate outgoing messages 113. In block 303, the overload controls module 114, may monitor resources metrics resulting from running the processing module 200 on a computer or computer system. In block 304, the overload controls module 114 may compare a monitored resource metric against a threshold in thresholds 209 to determine if there is an overload. In block 305, the overload control module 114 may transition the SIP server 150 to an overload state if an overload is detected.

Figure 4:
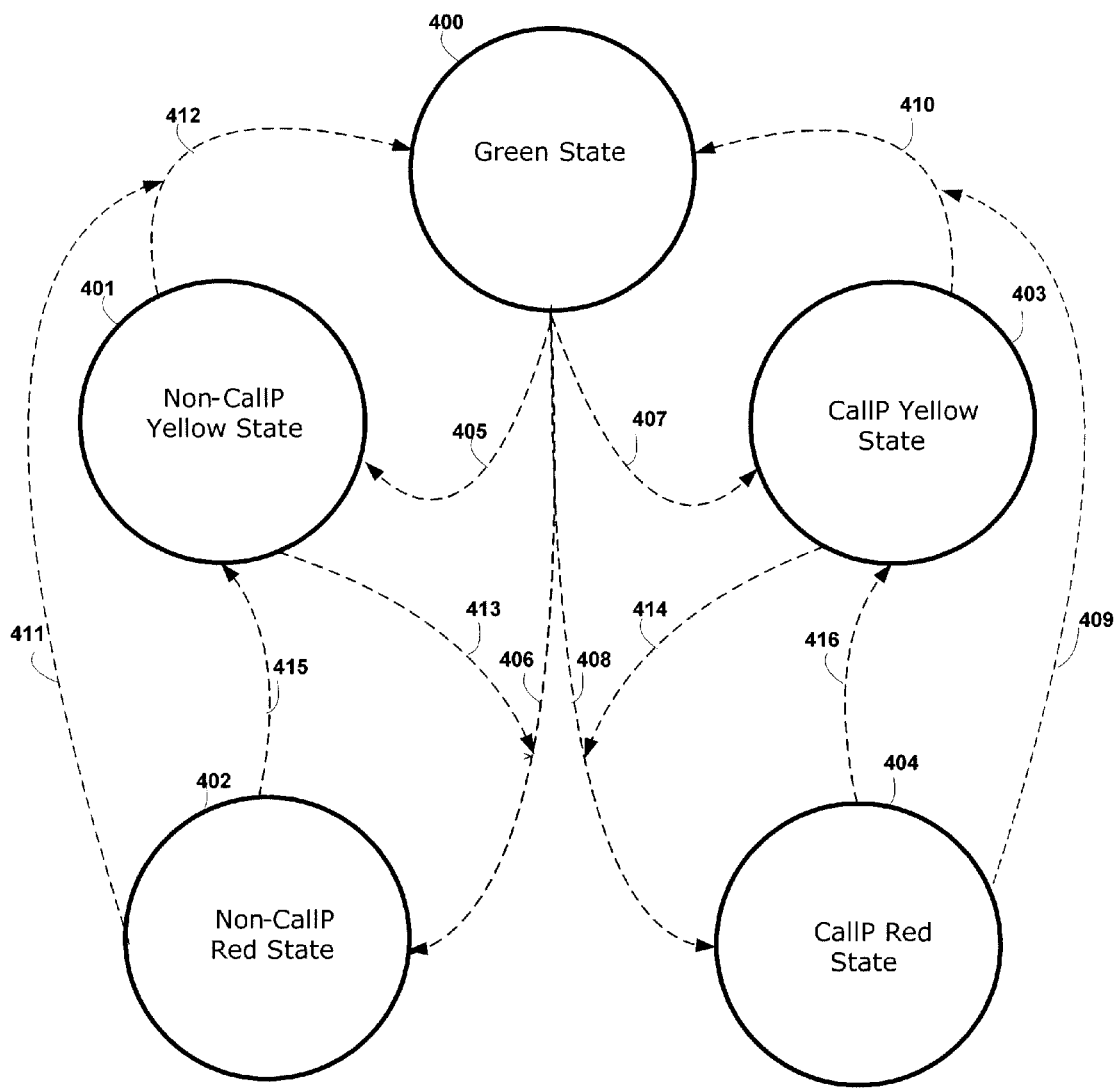
FIG. 4 illustrates the overload states and state transition diagram for a SIP server in an exemplary embodiment of the invention.

FIG. 4 illustrates the overload states and state transition diagrams for a SIP server in an exemplary embodiment of the invention. The exemplary states of the SIP server 150 may include green state 400, non-CallP yellow state 401, non-CallP red state 402, CallP yellow state 403, and CallP red state 404. More or less states may be included for the SIP server 150 as may be desired. For example, less states may be used to concentrate control actions and more states may be used to diffuse control actions.

The server 150 may start in green state 400, which may be a non-overload (or normal) state. There may be four overload states available, namely, non-CallP yellow state 401, non-CallP red state 402, CallP yellow state 403, and CallP red state 404. Each state 401-404 may have a set of associated control actions that may be applied to mitigate the overload once the SIP server 150 enters that specific overload state.

The control actions in each of the states 401-404 may include both internal control actions and external control actions. Internal control actions may represent actions performed on the SIP server 150 internally, such as, for example, automatically increasing the SIP retry timers to stem the retry traffic and avoid message flooding, discarding messages pulled off the queue that are older that a predefined maximum message age, doubling all route advance timers, disabling automatically scheduled maintenance tasks, turning off all logging functions, etc. External control actions may represent control actions relayed to neighbors of the SIP server 150, such as, for example, blocking 50% of new requests by returning a "503 Service Unavailable" with or without a Retry-After header, a "302 Temporarily Moved" redirecting the call to another SIP server 150, returning no response to traffic neighbor's SIP request to stimulate a route advancement, etc.

For example, the control action associated with non-CallP yellow state 401 may include: reject 50% of non-CallP SIP messages and/or discard messages older than a maximum message age from queues 101 and/or 111.

For example, the control action associated with non-CallP red state 402 may include: reject 100% of non-CallP SIP messages and/or discard messages older than a maximum message age from queues 101 and/or 111.

For example, the control action associated with CallP yellow state 403 may include: reject 50% of new calls; double SIP retry timers and route advance timers; disable automatically scheduled maintenance tasks; turn off all logging functions; and/or apply all non-CallP red state control actions.

For example, the control action associated with CallP red state 404 may include: reject 100% of new calls; quadruple SIP retry timers and route advance timers; and apply all non-CallP yellow state control actions.

The control actions associated with any of the CallP overload states 403-404 may include all control actions for non-CallP red state 402.

From the green state 400, a SIP server 150 may escalate to any of the existing overload states 401-404 based on trigger conditions associated with system resource metrics (e.g., CallP queue delay 201, non-CallP queue delay 202, process memory usage 204, CPU utilization 203, etc). Non-CallP trigger conditions may drive the non-CallP overload states 401 and 402 and CallP trigger conditions may drive the CallP overload states 403 and 404. By differentiating CallP and non-CallP messages, the SIP server 150 may be able to deal with a non-CallP driven overload (e.g., REGISTER storm) without impacting normal call processing.

For example, the trigger conditions for escalating the SIP server 150 from green state 400 to non-CallP yellow state 401 via path 405 may include non-CallP queue delay 202 being above a queue delay threshold for entering non-CallP yellow state 401. For example, the trigger conditions for escalating the SIP server 150 from green state 400 to non-CallP red state 402 via path 406 may include non-CallP queue delay 202 being above a delay threshold for entering non-CallP red state 402, the threshold for entering non-CallP red state 402 being higher than the threshold for entering non-CallP yellow state 401.

For example, the trigger conditions for escalating the SIP server 150 from green state 400 to CallP yellow state 403 via path 407 may include CallP queue delay 201 being above a queue delay threshold for entering CallP yellow state 403. For example, the trigger conditions for escalating the SIP server 150 from green state 400 to CallP red state 404 via path 408 may include CallP queue delay 201 being above a queue delay threshold for entering CallP red state 404, the CallP queue delay 201 threshold for entering CallP red state 404 being higher than the CallP queue delay 201 threshold for entering CallP yellow state 403.

For example, the trigger conditions for escalating the SIP server 150 from green state 400 to CallP yellow state 403 via path 407 may include process memory usage 204 being above a memory usage threshold for entering CallP yellow state 403. For example, the trigger conditions for escalating the SIP server 150 from green state 400 to CallP red state 404 via path 408 may include process memory usage 204 being above a memory usage threshold for entering CallP red state 404, the process memory usage 204 threshold for entering CallP red state 404 being higher than the process memory usage 204 threshold for entering CallP yellow state 403.

For example, the trigger conditions for escalating the SIP server 150 from green state 400 to CallP yellow state 403 via path 407 may include CPU utilization 203 being above a CPU utilization threshold for entering CallP yellow state 403. For example, the trigger conditions for escalating the SIP server 150 from green state 400 to CallP red state 404 via path 408 may include CPU utilization 203 being above a CPU utilization threshold for entering CallP red state 404, the CPU utilization 203 threshold for entering CallP red state 404 being higher than the CPU utilization 203 threshold for entering CallP yellow state 403.

Once transitioned to one of the overload states 401-404, the SIP server 150 may remain in that state for a minimum holding period. During the holding period, if the set of trigger conditions for the state escalation (e.g., queue delay or process memory usage) worsens, then the SIP server 150 may be immediately escalated to a new overload state with a higher threshold corresponding to a heavier load. Once the holding period expires, if the set of trigger conditions for the state escalation (e.g., queue delay or process memory usage) remains, the SIP server 150 may reset the holding period timer and remain in that overload state. On the other hand, if the set of trigger conditions for the state escalation (e.g., queue delay or process memory usage) improve (e.g., falls below the threshold level that caused the state escalation), the SIP server 150 may transition to a state with a lower level of threshold or the green state 400.

For example, the trigger conditions for escalating the SIP server 150 from non-CallP yellow state 401 to non-CallP red state 402 via path 413 may include: non-CallP queue delay 202 being above a queue delay threshold for entering non-CallP red state 402.

For example, the trigger conditions for escalating the SIP server 150 from CallP yellow state 403 to CallP red state 404 via path 414 may include: CallP queue delay 201 being above a queue delay threshold for entering CallP red state 404.

For example, the trigger conditions for escalating the SIP server 150 from CallP yellow state 403 to CallP red state 404 via path 414 may include: process memory usage 204 being above a memory usage threshold for entering CallP red state 404.

For example, the trigger conditions for escalating the SIP server 150 from CallP yellow state 403 to CallP red state 404 via path 414 may include CPU utilization 203 being above a CPU utilization threshold for entering CallP red state 404.

Once transitioned to an overload state, the SIP server 150 may remain in that overload state for a minimum holding period. Once the holding period expires, if the set of trigger conditions for the state escalation (i.e., queue delay, process memory usage, and/or CPU utilization) no longer exists, then the control actions associated with that state may be removed and the SIP server 150 may return to the green state 400 or a state whose associated trigger conditions comprise lower thresholds.

For example, the trigger conditions for returning the SIP server 150 from non-CallP yellow state 401 to green state 400 via path 412 may include: non-CallP queue delay 202 being less than a queue delay threshold for entering non-CallP yellow state 401 and the SIP server 150 having dwelled in non-CallP yellow state 401 for a minimum holding period. For example, the trigger conditions for returning the SIP server 150 from non-CallP red state 402 to green state 400 via path 411 may include: non-CallP queue delay 202 being less than the queue delay threshold for entering non-CallP yellow state 401 and the SIP server 150 having dwelled in non-CallP red state 402 for a minimum holding period. For example, the trigger conditions for transitioning SIP server 150 from non-CallP red state 402 to non-CallP yellow state 401 via path 415 may include: non-CallP queue delay 202 being less than a queue delay threshold for entering non-CallP red state 402 and no less than the queue delay threshold for entering non-CallP yellow state 401 and the SIP server 150 having dwelled in non-CallP red state 402 for a minimum holding period, the non-CallP queue delay 202 threshold for entering non-CallP red state 402 being higher than the non-CallP queue delay 202 threshold for entering non CallP yellow state 401.

For example, the trigger conditions for returning SIP server 150 from CallP yellow state 403 to green state 400 via path 410 may include: CallP queue delay 201 being less than a queue delay threshold for entering CallP yellow state 403 and the SIP server 150 having dwelled in CallP yellow state 403 for a minimum holding period. For example, the trigger conditions for returning SIP server 150 from CallP red state 404 to green state 400 via path 409 may include: CallP queue delay 201 being less than the queue delay threshold for entering CallP yellow state 403 and the SIP server 150 having dwelled in CallP red state 404 for a minimum holding period.

For example, the trigger conditions for transitioning SIP server 150 from CallP red state 404 to CallP yellow state 403 via path 416 may include: CallP queue delay 201 being less than a queue delay threshold for entering CallP red state 404 and no less than the queue delay threshold for entering CallP yellow state 403, and the SIP server 150 having dwelled in CallP red state 404 for a minimum holding period, the CallP queue delay 201 threshold for entering CallP red state 404 being higher than the CallP queue delay 201 threshold for entering CallP yellow state 403.

For example, the trigger conditions for returning SIP server 150 from CallP yellow state 403 to green state 400 via path 410 may include: process memory usage 204 being less than a memory usage threshold for entering CallP yellow state 403 and the SIP server 150 having dwelled in CallP yellow state 403 for a minimum holding period. For example, the trigger conditions for returning SIP server 150 from CallP red state 404 to green state 400 via path 409 may include: process memory usage 204 being less than the memory usage threshold for entering CallP yellow state 403 and the SIP server 150 having dwelled in CallP red state 404 for a minimum holding period. For example, the trigger conditions for transitioning SIP server 150 from CallP red state 404 to CallP yellow state 403 via path 416 may include: process memory usage 204 being less than a memory usage threshold for entering CallP red state 404 and no less than the memory usage threshold for entering CallP yellow state 403, and the SIP server 150 having dwelled in CallP red state 404 for a minimum holding period, the process memory usage 204 threshold for entering CallP red state 404 being higher than the process memory usage 204 threshold for entering CallP yellow state 403.

For example, the trigger conditions for returning SIP server 150 from CallP yellow state 403 to green state 400 via path 410 may include: CPU utilization 203 being less than a CPU utilization threshold for entering CallP yellow state 404 and the SIP server 150 having dwelled in CallP yellow state 403 for a minimum holding period. For example, the trigger conditions for returning SIP server 150 from CallP red state 404 to green state 400 via path 409 may include: CPU utilization 203 being less than the CPU utilization threshold for entering non-CallP yellow state 403 and the SIP server 150 having dwelled in CallP red state 404 for a minimum holding period. For example, the trigger conditions for transitioning SIP server 150 from CallP red state 404 to CallP yellow state 403 via path 416 may include: CPU utilization 203 being less than a CPU utilization threshold for entering CallP red state 404 and no less than the CPU utilization threshold for entering CallP yellow state 403, and the SIP server 150 having dwelled in CallP red state 404 for a minimum holding period, the CPU utilization 203 threshold for entering CallP red state 404 being higher than the CPU utilization 203 threshold for entering CallP yellow state 403.

As an example of overload state transition, a SIP server 150 may start in green state 400 during normal busy hour traffic. The rolling average CallP queue delay 201 for the CallP adapter queue may reach 1000 msec which is greater than a threshold of 980 msec to enter CallP yellow state 403. The SIP server 150 may transition, via path 407, to CallP yellow state 403 and may apply control actions associated with CallP yellow state 403. The rolling average CallP queue delay 201 for the CallP adapter queue 107 may now increase to 2000 msec which is greater than a threshold of 1580 msec to enter CallP red state 404. The SIP server 150 may transition, via path 414, to CallP red state 404 and may apply control actions associated with CallP red state 404. The rolling average CallP queue delay 201 for the CallP adapter queue may now reduce to 1000 msec. The delay time value may be enough to return the SIP server 150 to CallP yellow state 403. If the SIP server 150 has not completed the minimum holding period in CallP red state 404, the SIP server 150 may remain in the CallP red state 404. After the minimum holding period for CallP red state 404 expires, the rolling average CallP queue delay 201 for the CallP adapter queue 107 may be reduced to 200 msec, which is below the 980 msec delay threshold to enter CallP yellow state 403, and the SIP server 150 may return to green state 400. The SIP server 150 may enter the green state 400 via path 209 and remove all previously applied control actions.

The SIP server 150 may only be in one overload state at a time. Although the available states may be mutually exclusive in existence, since the control actions associated with the CallP overload states 403 and 404 may include all control actions associated with the non-CallP red state 402, the CallP overload states 403 and 404 may be super states that encompass the non-CallP overload states 401 and 402. Thus, as soon as the SIP server 150 enters a CallP overload state 403 or 404, non-CallP overload states 401 and 402 may cease to apply. If, when the SIP server 150 exits a CallP overload state 403 or 404 and the conditions continue to warrant a non-CallP overload state 401 or 402, the server may enter the non-CallP overload state by returning to the green state 400 and immediately transitioning to the overload non-CallP overload state.

A proxy SIP server refers to a server that routes SIP sessions. A registration SIP server refers to a SIP server that handles the registration of user agents. The SIP server 150 may be both a proxy server and a registration server by differentiating two types of messages and states. For example, the CallP type of messages is for session routing. For example, the non-CallP type of overload states is for handling an overload of registration of user agents. Thus the SIP server 150 provided by the invention may be both a proxy server and a registration server.

The SIP server 150 may be implemented as a computer or a computer system. A SIP server may also be a SIP server application on a computer or computer system. A SIP server application may be a computer program that accepts SIP messages from a network, processes the messages, and applies service when appropriate.

A computer or computer system may have at least the following hardware: one processor (e.g. CPU); a plurality of memories; a network-connection; and a computer-readable medium containing software to be executed by the computer or computer system. Exemplary hardware network connection may include a network interface card (NIC). Exemplary computer-readable medium may include: a hard disk drive; a floppy disk; a magneto-optical disk; an optical disk; such as a CD-ROM or a DVD or a Blue-ray disk; a magnetic tape; a flash removable memory; a memory chip; and/or other types of media that can store computer-readable instructions thereon.

Figure 5A:
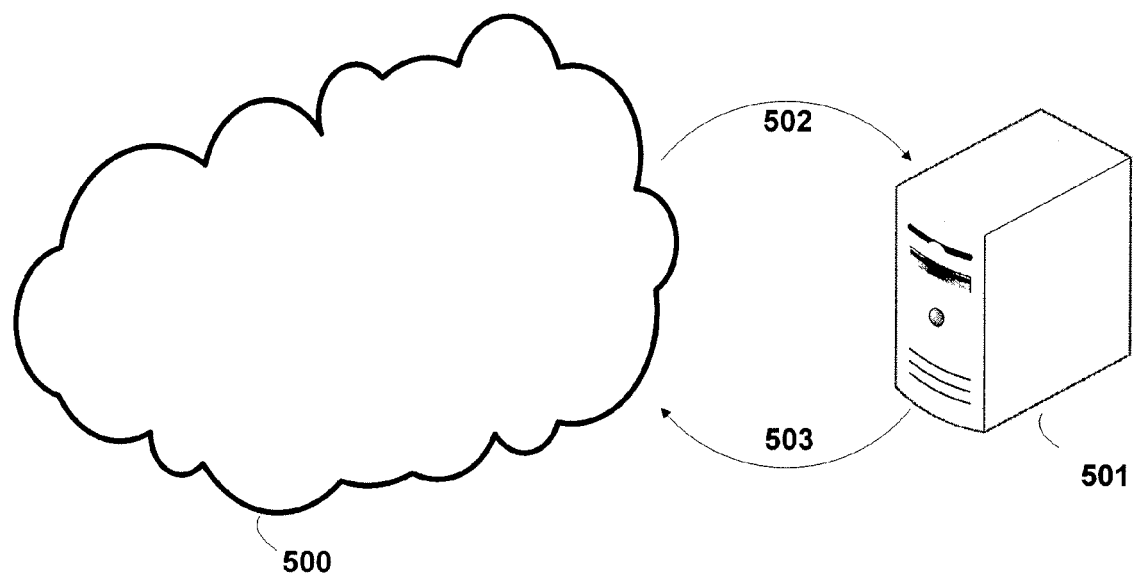
FIG. 5A illustrates an exemplary server computer in relation to a communications network in an exemplary embodiment of the invention.

FIG. 5A illustrates an exemplary server computer in relation to a communications network in an exemplary embodiment of the invention. The communications network 500 may include both PSTN and IP-based systems. The server computer 501 may receive incoming SIP messages 100 from the communications network 500 via path 502 and deliver outgoing SIP messages 113 via path 503 to the communications network 500.

Figure 5B:
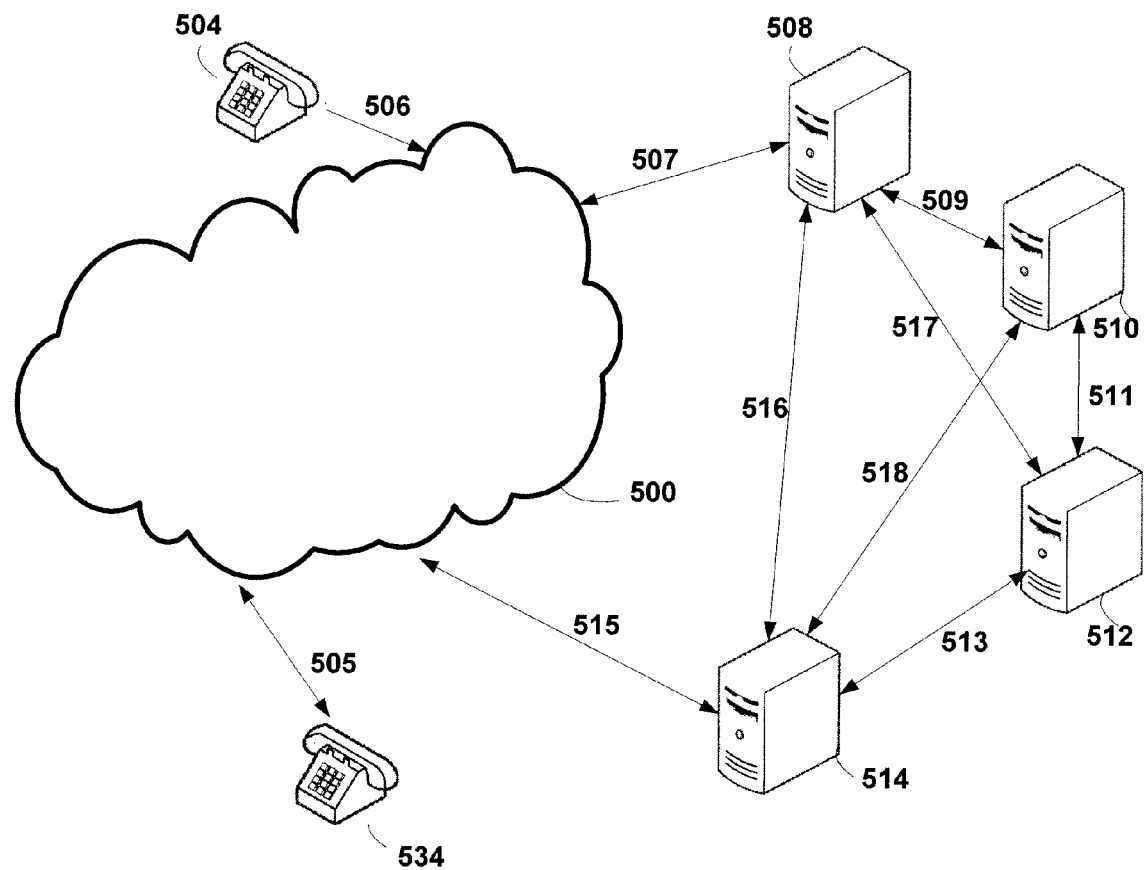
FIG. 5B illustrates an exemplary server computer system comprising multiple server computers in an exemplary embodiment of the invention.

FIG. 5B illustrates an exemplary server computer system comprising multiple server computers in an exemplary embodiment of the invention. A caller 504 may place a call on a communications network 500 with caller 534 as recipient. Link 506 between caller 504 and the communications network 500 may be bi-directional. A SIP server computer 508 may receive incoming SIP messages 100 from the communications network 500 via link 507 and may process the incoming SIP messages 100. Link 507 between the server computer 508 and the communications network 500 may be bi-directional. The server computer may send some of the outgoing SIP messages 113 to at least one of the neighbor SIP server computers in the server computer system, namely, 510, 512, and 514, for further processing before the outgoing SIP messages 113 may be routed to the communications network 500. A SIP message may thus travel through multiple SIP server computers en-route to the caller 534. The links 509, 511, 513, 516, 517, and 518 between SIP server computers 508, 510, 512, and 514 may be bi-directional and may carry IP packets. A neighbor SIP server computer 510, or 512, or 514 may also forward some of the outgoing SIP messages 113 to another neighbor SIP server computer. Thus, the SIP messages associated with the same session may travel through different SIP server computers en-route to caller 534. There may be at least two callers 534 and 504 in an internet call session. Link 505 between caller 534 and the communications network 500 may be bi-directional.

Figure 5C:
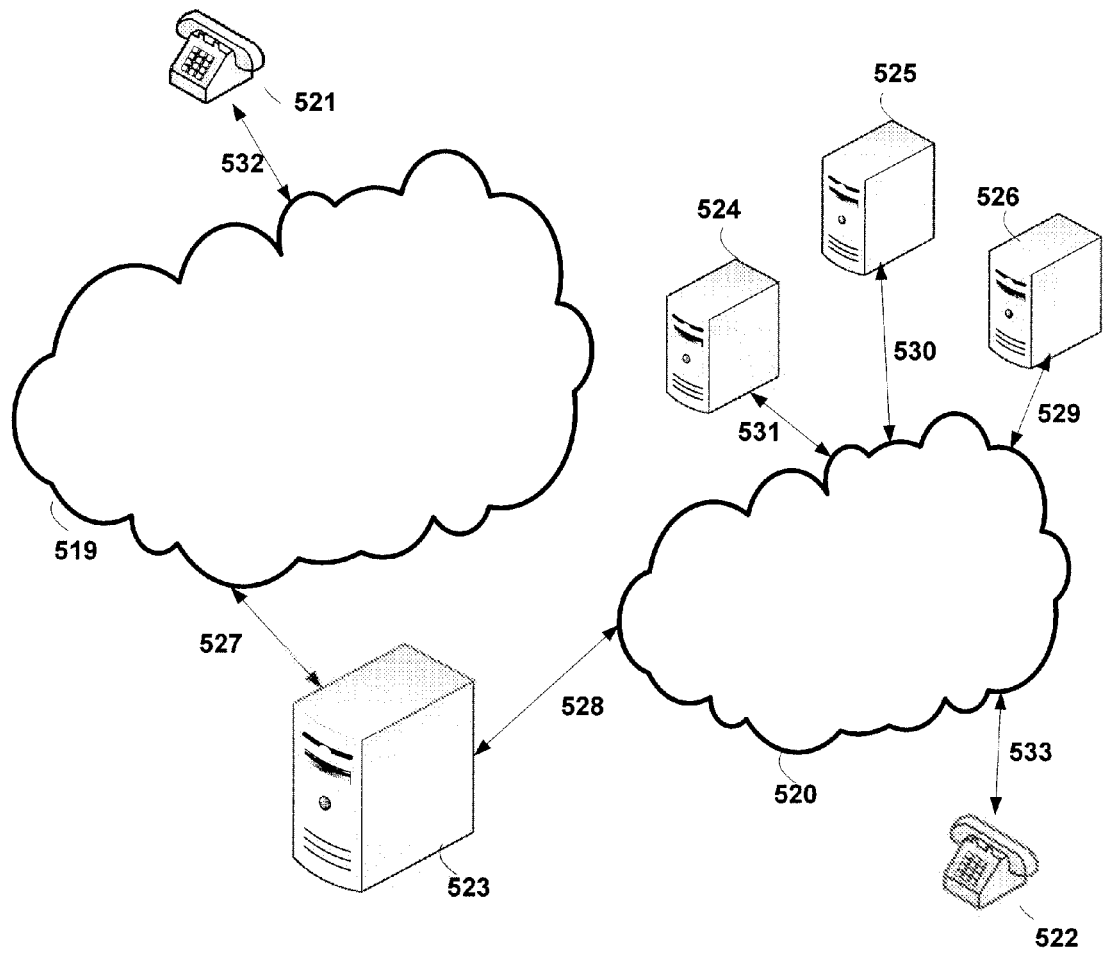
FIG. 5C illustrates an exemplary server computer system in an exemplary embodiment of the invention.

FIG. 5C illustrates an exemplary configuration of calling from different networks in an exemplary embodiment of the invention. A caller 521 may place a call on a communications network 519 with caller 522 as recipient. Link 532 between caller 521 and the communications network 519 may be bi-directional. As caller 522 may reside on a local area network (LAN) 520 behind a firewall, the incoming SIP messages 100 may be filtered at a border computer 523. Link 527 between the border computer 523 and the communications network 519 may be bi-directional. Subsequently, the SIP messages may be serviced by a SIP server on the border computer 523 or a SIP server computer 524, 525, or 526 on the LAN 520. Afterwards, outgoing SIP messages 113 may be generated en-route to caller 522. Links 528-513, and 533 between LAN 520 and a SIP server computer on LAN 520 may be bi-directional.

When implemented as a computer or computer system, the SIP server 150 may be generally applicable towards multimedia communications over the internet that may utilize a combination of different content forms including, for example, text, audio/voice, still images, animation, video, and/or interactivity content forms.

When implemented as a SIP server application computer program, the invention may be embodied as a computer readable medium containing software code to be executed on a computer. The software may encode processing module 200 and/or overload control module 114.

For example, processing module 200 may be implemented as software, executable on a computer, to receive SIP messages and process SIP messages. The instructions may encode the components illustrated in the SIP server 150 of FIG. 1. For example, the queues 101, 103, 104, 107, 108, and 111 may be implemented as first-in-first-out data structures. For example, quick SIP decoder 102 may be implemented as instructions to type-cast received SIP messages into CallP related or non-CallP related. For example, decoders 105 and 106 may be implemented as instructions to place parsed message contents into the queue associated with an existing session to which the message belongs or into a new queue corresponding to a new session. For example, adapter threads 109 and 110 may be implemented as instructions to process queued messages and apply services when appropriate. For example, encoder 112 may be implemented as instructions to construct outgoing SIP messages and send the outgoing SIP messages.

The medium embodiment of the SIP server application may also encode the overload control module 114 as illustrated in FIGS. 2 and 3. For example, overload controls module 114 may be implemented as instructions to monitor resource metrics (e.g., CallP queue delay 201, non-CallP queue delay 202, CPU utilization 203, process memory usage 204), to compare a monitored resource metric against a threshold, and to transition the state of the SIP server when appropriate. The instructions may also include a software interface 207 for communications with processing module 200 so that overload and control module 114 may send signals to decoders 115 and 116 in processing module 200. The software interface may be implemented as sockets, message passing interface (MPI), and/or shared memory.

When implemented as a SIP server application computer program, the server state information may be encoded in the stack or the data segment associated with the SIP server application program being run as a process on a computer or computer system. Additionally, the computer program may include instructions defining control actions associated with each state that may be activated via a rule-based software interrupt or exception handler. Various programming languages, for example, JAVA, C, and C++, have support for software interrupt and exception handler.

The queue entry time may be recorded as a tag on the SIP message to be inserted into a queue. When implemented as software, the tag may be a field in the SIP message data structure. The queue entry time may also be recorded elsewhere, for example, a look-up table data structure in the stack or data segment associated with the server application program that the overload control module 114 may access. The queue entry time may be read from the hardware of the computer running the SIP server application program, for example, the system clock on the main board of the computer. The queue entry time may also be read from a remote device, for example, a network time server running the network time protocol (NTP) or the simple network time protocol (SNTP). In addition to a floating-point format, the encoded queue entry time may also be rounded into a fixed-point format or ASCII format to save time in computing the queue delay time.

CPU utilization 203 and process memory usage 204 may be obtained by querying the operating system on the computer running the SIP server application through, for example, application program interfaces (APIs). Various programming languages and tools may implement APIs for accessing the information of CPU utilization 203 and process memory usage 204 associated with a computer program being run as a process on a computer. For example, Microsoft Visual Studio has an API of GetProcessMemoryInfo for a user program to obtain information of the amount of memory used by a process. Overload control module 114 may even directly obtain CPU utilization 203 and/or process memory usage 204 of a process by listing the /proc tree under the process identification number of that process on a computer running the LINUX operating system.

The thresholds 209 used for comparison against monitored resource metrics 201-204 may be configurable. The thresholds may be encoded in a configuration file or stored in a database to be read by a SIP server application embodying the invention. The thresholds may also be entered or modified by a human user or another computer program when the server application embodying the invention is being run as a process on a computer. For example, a graphic user interface (GUI), may be used for a human user to enter the thresholds for monitored resource metrics. For example, a software interface, in the form of sockets, message passing interface, and/or shared memory, may be used by another computer program to send the thresholds for monitored resource metrics to the server application embodying the invention being run as a process.

The minimum holding periods that stipulate the shortest time a SIP server 150 may dwell in an overload state may be configurable in the same manner.

The maximal age of SIP messages, beyond which the SIP messages on an overload SIP server can be discarded, may be configurable in the same manner.

The server application may be implemented as one monolithic SIP server 150 as illustrated in FIG. 1 comprising both a processing module 200 and an overload control module 114. The communication and data sharing may be straightforward which may allow for a tight integration.

The server application may also be implemented as separate processing module 200 and overload control module 114. This modular approach may allow one overload control module 114 to perform overload control for several SIP servers 150, each may be designated for different purposes that may lead to different levels of thresholds for resource metrics. For example, premium users paying more fees may be designated to a SIP server 150 with lower levels thresholds. For example, one SIP server 150 may be dedicated to 911 calls with lowest levels of thresholds. Moreover, overload control module 114 may perform overload control for SIP servers 150 residing on different computers. Thus, a modular approach may improve flexibility and granularity in quality of service.

The examples and embodiments described herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method to manage overload for a session initiation protocol (SIP) server, comprising:

receiving SIP messages at the SIP server from a communications network;

processing, in the SIP server, the received SIP messages to obtain processed SIP messages, wherein said processing comprises:

(a) parsing received incoming SIP messages to classify the messages as one of non-call processing (non-CallP) related or call processing (CallP) related and placing the classified SIP messages in one of a non-CallP decoder queue or a Call-P decoder queue based on the classification;

(b) parsing a queued SIP message to determine if the queued SIP message is a new request or a request or response associated with an existing session and placing the queued SIP message in one of a new adapter queue associated with a new session or an existing adapter queue associated with an existing session based on the determination;

(c) pulling a message off an adapter queue, processing the message, and applying appropriate services;

(d) passing required information in reference to an existing session to an encoder queue; and (e) pulling information off the encoder queue, building an out-bound SIP message, and sending the outbound SIP message;

detecting an overload based on a trigger condition associated with at least one resource metric as a result of receiving SIP messages from the communications network at the SIP server and processing the received SIP messages in the SIP server;

transitioning the SIP server to an overload state and applying associated control actions thereto when the overload is detected to mitigate the overload.

2. The method as set forth in claim 1, wherein the resource metric comprises at least one of: queue delay, process memory usage, or central processing unit (CPU) utilization.

3. The method as set forth in claim 1, wherein the trigger condition comprises at least one of:

comparing queue delay with a first threshold;

comparing process memory usage with a second threshold; or comparing CPU utilization with a third threshold.

4. The method as set forth in claim 3, wherein a rolling average is calculated on a moving window covering a number of queue delays and the rolling average is used in the comparison of the queue delay with the first threshold.

5. The method as set forth in claim 1, wherein the overload state is one of a first overload state and a second overload state wherein the first overload state has a first set of associated trigger conditions and the second overload state has a second set of associated trigger conditions, the thresholds in the first set of trigger conditions being no higher than the thresholds in the second set of trigger conditions.

6. The method as set forth in claim 5, further comprising at lease one of:

transitioning the SIP server in a normal state to the first overload state when the first set of trigger conditions associated with the first overload state are met but the second set of trigger conditions associated with the second overload state are not met;

transitioning the SIP server in the normal state to the second overload state when the second set of trigger conditions associated with the second overload state are met;

transitioning the SIP server in the first overload state to the second overload state when the set of trigger conditions associated with the second overload state are met;

transitioning the SIP server in the first or second overload state back to the normal state when the sets of overload trigger conditions become invalid and the SIP server has dwelled in the first or second overload state for a minimum holding period; or transitioning the SIP server in the second overload state to the first overload state when the SIP server has dwelled in the second overload state for a minimum holding period and the second set of trigger conditions associated with the second overload state become invalid but the first set of trigger conditions associated with the first overload state are still valid.

7. The method as set forth in claim 1, wherein an overload state has a set of associated control actions to mitigate overload, the control actions are being directed to the SIP server internally and/or externally.

8. The method as set forth in claim 1, wherein a time stamp is recorded to track when a SIP message is entered into a queue.

9. A computer readable medium comprising software, which when executed by a computer, causes the computer to perform operations to manage overload for a session initiation protocol (SIP) server on a network, the computer readable medium comprising:

instructions for receiving, at the SIP server, SIP messages from a communications network;

instructions for servicing the received SIP messages in the SIP server, comprising:
(a) instructions for parsing incoming SIP messages to classify the messages as one of non-call processing (non-CallP) related or call processing related (CallP) and placing the messages in one of non-CallP decoder queue or Call-P decoder queue based on the classification;
(b) instructions for parsing a queued message to determine if the message is a new request or a request or response associated with an existing session, and placing the message in one of a new adapter queue associated with a new session or an existing adapter queue associated with an existing session based on the determination;
(c) instructions for pulling a message off the adapter queue, processing the message, and applying services when appropriate;
(d) instructions for passing required information in reference to an existing session to the encoder queue; and
(e) instructions for pulling information off the encoder queue, building an out-bound SIP message, and sending the outbound SIP message; and
instructions for transitioning the SIP server to an overload state, applying associated control actions thereto, and defining a trigger condition to be met, the trigger condition being associated with at least one resource metric.

10. The medium as set forth in claim 9, further comprising:
instructions for defining the resource metric comprising at least one of: queue delay; process memory usage; or CPU utilization; and
instructions for defining the trigger condition comprising at least one of:
comparing queue delay time with a first threshold;
comparing process memory usage with a second threshold; and
comparing CPU utilization with a third threshold.

11. The medium as set forth in claim 10, further comprising:
instructions for calculating a rolling average based on a moving window covering a number of queue delays to be used in the comparison of the queue delay with the first threshold.

12. The medium as set forth in claim 9, further including:
instructions for defining a first set of trigger conditions associated with a first overload state and a second set of trigger conditions associated with a second overload state; the thresholds in the first set of trigger conditions being no higher than the thresholds in the second set of trigger conditions.

13. The medium as set forth in claim 12, further comprising at lease one of:
instructions for transitioning the SIP server in a normal state to the first overload state after having determined that the first set of trigger conditions transitioning associated with the first set are met while the second set of trigger conditions associated with the second overload state are not;
instructions for transitioning the SIP server in the normal state to the second overload state after having determined that the second set of trigger conditions associated with the second overload state are met;
instructions for transitioning the SIP server in the first overload state to the second overload state after having determined that the second set of trigger conditions associated with the second overload state are met, instructions for transitioning the SIP server in the first or second overload state back to a normal state after having determined that the SIP server has dwelled in the first or second overload state for a minimum holding period and the sets of trigger conditions become invalid; or
instructions for transitioning the SIP server in the second overload state to the first overload state after having determined that the SIP server has dwelled in the second overload state for a minimum holding period and the second set of trigger conditions associated with the second overload state become invalid but the first set of trigger conditions associated with the first overload state remain valid.

14. The medium as set forth in claim 9, further comprising:
instructions for defining a set of control actions associated with an overload state to mitigate overload, the set of control actions comprising control actions directed towards the SIP server internally and/or externally.

15. The medium as set forth in claim 9, further comprising:
instructions for obtaining a time-stamp from at least one of the computer or the network; and
instructions for recording the time-stamp to record the time a SIP message is placed into a queue.

16. A system for multimedia communication over a network, comprising:
a network connection to receive and transmit a plurality of SIP messages between a SIP server and the network;
a processing module in the SIP server to process and service received SIP messages comprising:
a first queue to hold received SIP messages;
a first decoder to classify the received SIP messages into at least two message types;
a decoder queue for each message type to hold the classified SIP messages;
a plurality of SIP decoders to group SIP messages in a decoder queue into existing sessions or new sessions;
a plurality of adapter queues associated with existing sessions and new sessions to hold SIP messages;
a plurality of adapters, each associated with an adapter queue, to process and service sessions;
an encoder queue to hold information encoding outbound SIP messages; and
an encoder to build and send outbound SIP messages; and
an overload control module to perform overload control for the SIP server comprising:
a monitor to track at least one resource metrics as a result of running the processing module to process and service received SIP messages; and
a comparator to determine overload exists if at least one tracked resource metric as a result of running the processing module is over a threshold,
wherein the overload control module transitions the SIP server to a new state if overload exists.

17. The system as set forth in claim 16, wherein the overload control module further comprises a software interface to send signals to the processing module wherein the signals are for transitioning the state of the SIP server.

18. The system as set forth in claim 16, wherein the resource metric comprises at least one of: queue delay time, process memory usage, or central processing unit (CPU) utilization.

19. The system as set forth in claim 16, wherein the SIP server comprises the overload control module and the processing module.

20. The system as set forth in claim 16, wherein the SIP server comprises the processing module but not the overload control module.

21. The system as set forth in claim 16, wherein the SIP decoders are further adapted to receive signals from the overload control module and after a signal is received from the overload control module, to perform at least one of:
- forwarding at least one SIP message in the adapter queues to the encoder queue;
- rejecting at least one SIP message in the decoder queues;
- increasing at least one SIP server timer;
- discarding at least one SIP message in the first queue and/or the encoder queue; or
- generating at least one error message via the encoder.

22. The system as set forth in claim 21, wherein the SIP server timer is one of a retry timer or a route advance timer and the error message is related to one of service unavailable or service temporarily moved.

* * * * *